United States Patent
Shiga et al.

(10) Patent No.: US 7,749,590 B2
(45) Date of Patent: Jul. 6, 2010

(54) ANTI-CHIPPING FILM AND ELECTRIC APPARATUS USING THE FILM

(75) Inventors: Yuki Shiga, Osaka (JP); Yoshifumi Okauchi, Osaka (JP)

(73) Assignee: Kyocera Mita Corporation (JP)

( * ) Notice: Subject to any disclaimer, the term of this patent is extended or adjusted under 35 U.S.C. 154(b) by 674 days.

(21) Appl. No.: 11/274,533

(22) Filed: Nov. 15, 2005

(65) Prior Publication Data

US 2006/0105142 A1  May 18, 2006

(30) Foreign Application Priority Data

Nov. 17, 2004  (JP) ............... 2004-333071

(51) Int. Cl.
*B32B 3/24* (2006.01)

(52) U.S. Cl. .................. 428/136; 428/132; 411/541; 411/531

(58) Field of Classification Search .......... 428/136, 428/132; 411/541, 531
See application file for complete search history.

(56) References Cited

U.S. PATENT DOCUMENTS 3,428,842 A * 2/1969 Harris .................. 310/217
5,834,093 A * 11/1998 Challis et al. ............ 428/136
5,839,868 A * 11/1998 Kloian .................... 411/533
6,929,843 B2 * 8/2005 Kuchar .................... 428/136

* cited by examiner

*Primary Examiner*—William P Watkins, III
(74) *Attorney, Agent, or Firm*—Gerald E. Hespos; Michael J. Porco

(57) ABSTRACT

Disclosed is an anti-chipping film capable of preventing chips which would otherwise occur during an operation for inserting an engagement protrusion of a resin member into a mounting hole of a metal sheet, from being generated and scattered into an inner space of a frame. The anti-chipping film is adapted to be attachable to a given metal sheet to cover a (rectangular-shaped or circular shaped) mounting hole which is formed in the metal sheet to mount a given resin member. The anti-chipping film comprises a slit (linear-shaped slit, radial-shaped slit or H-shaped slit) formed in a central region thereof to allow an engagement protrusion protrudingly formed on the resin member to penetrate therethrough, and an adhesive layer laminated on an outer peripheral region thereof.

5 Claims, 5 Drawing Sheets

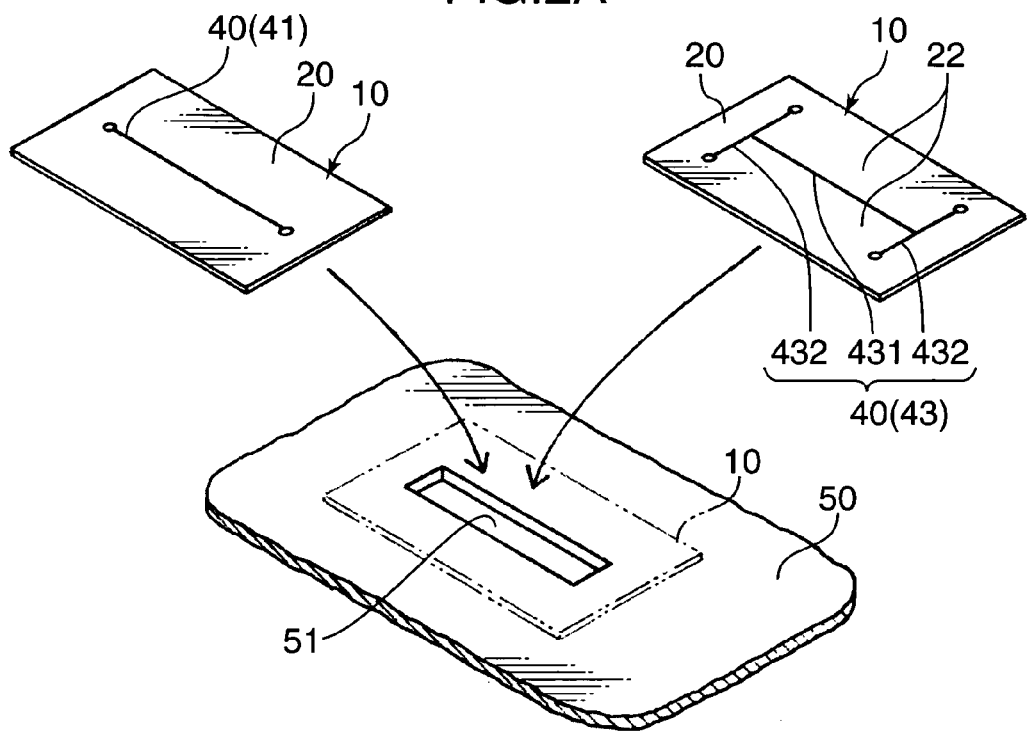
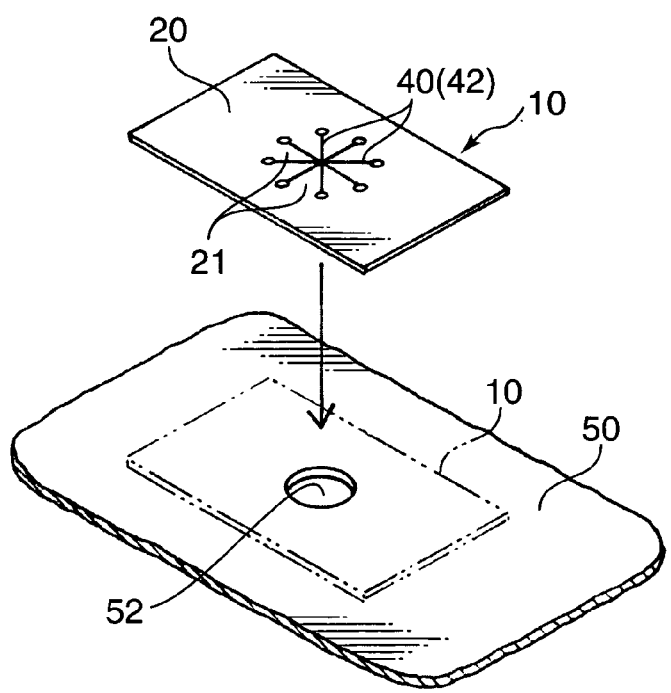

FIG.3A-a
FIG.3A-b
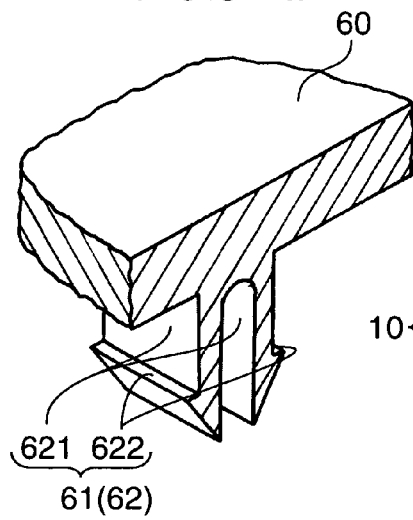
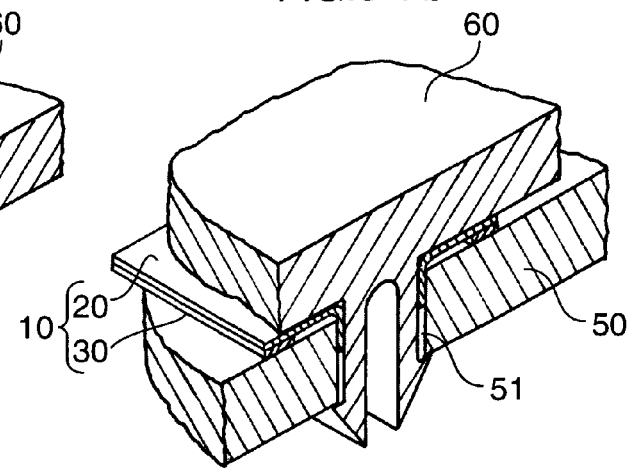
FIG.3B-a
FIG.3B-b
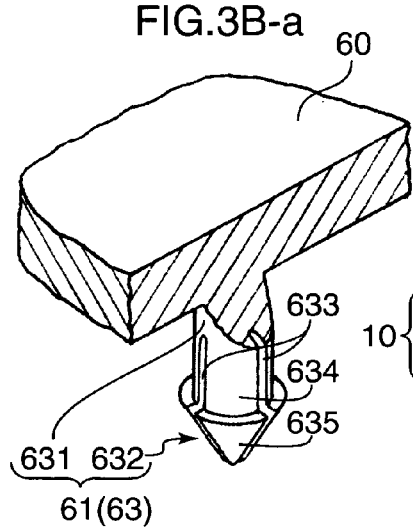
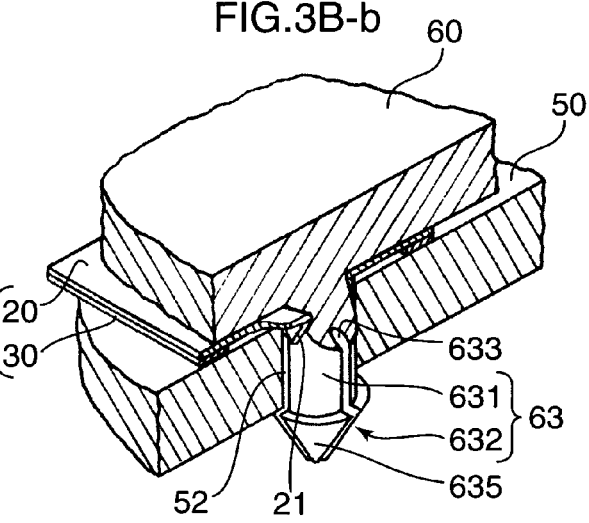
FIG.3C-a
FIG.3C-b
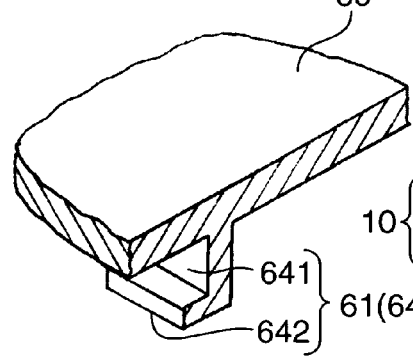
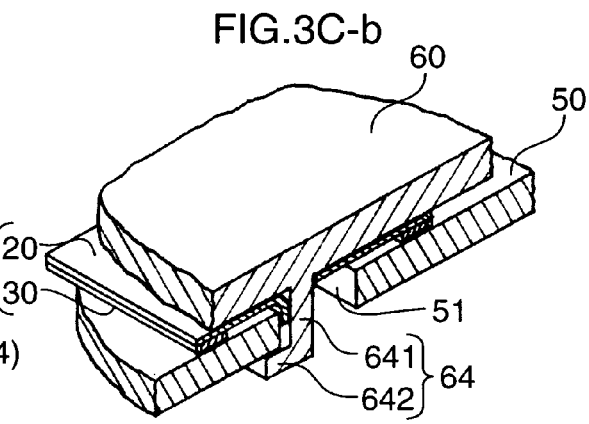

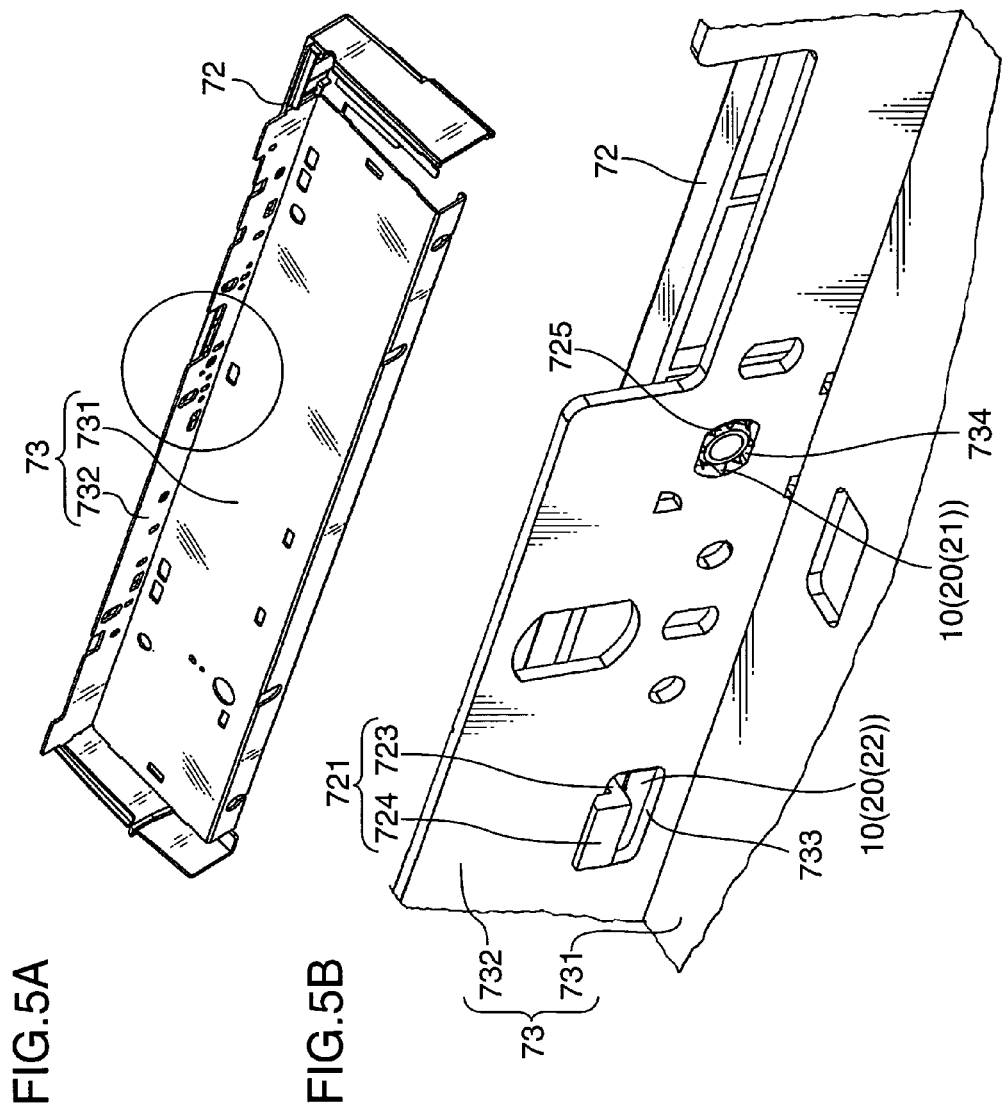

ANTI-CHIPPING FILM AND ELECTRIC APPARATUS USING THE FILM

BACKGROUND OF THE INVENTION

1. Field of the Invention

The present invention relates to an anti-chipping film adapted to be attachable to a given metal sheet to cover a mounting hole which is formed in the metal sheet to mount a given resin member, and an electric apparatus using the film.

2. Description of the Related Art

Most of electric apparatuses including household electric apparatuses, such as a television and a radio, office machines, such as a computer and an image forming apparatus, and optical apparatuses, such as a camera and a scanner built into an image forming apparatus, are assembled by mounting various components onto a frame or a structural member comprising a metal sheet formed into a given 3-dimensional shape and a given resin member attached thereto to serve as a rim member.

Typically, the metal sheet and the resin member are provided, respectively, with a plurality of mounting holes perforated at appropriate positions thereof, and a plurality of appropriately-shaped engagement protrusions formed at positions thereof corresponding to those of the mounting holes, and each of the engagement protrusions is inserted into a corresponding one of the mounting holes while being elastically deformed, so as to allow the resin member to be mounted onto the metal sheet. Upon completion of the operation for mounting the resin member onto the metal sheet, the elastically-deformed engagement protrusion returns to its original shape, so that the connection therebetween will be maintained.

In the above connecting structure between the metal sheet and the resin member, during the operation for inserting the engagement protrusion of the resin member into the mounting hole of the metal sheet, a surface of the engagement protrusion scrapes against an edge of the mounting hole to often result in generation and scattering of microscopic chips peeled from the engagement protrusion. Such chips getting into an inner space of the frame are likely to cause a problem about occurrence of malfunction in internal precision devices.

SUMMARY OF THE INVENTION

It is an object of the present invention to provide an anti-chipping technology which can overcome the problems residing in the prior art.

It is another object of the present invention to provide an anti-chipping film which can prevent chips which would otherwise occur during the operation for inserting the engagement protrusion of the resin member into the mounting hole of the metal sheet, from being generated and scattered into the inner space of the frame.

According to an aspect of the present invention, there is provided an anti-chipping film adapted to be attachable to a given metal sheet to cover a mounting hole which is formed in the metal sheet to mount a given resin member. The anti-chipping film comprises a slit formed therein to allow an engagement protrusion protrudingly formed on the resin member to penetrate therethrough, and an adhesive layer laminated on an outer peripheral region thereof.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 2A is a fragmentary enlarged perspective view showing a metal sheet to be attached with the anti-chipping film according to the first or third embodiment.

FIG. 2B is a fragmentary enlarged perspective view showing a metal sheet to be attached with the anti-chipping film according to the second embodiment.

FIGS. 3A-a and 3A-b are explanatory fragmentary sectional enlarged perspective views of a typical usage of the anti-chipping film according to the first embodiment.

FIGS. 3B-a and 3B-b are explanatory fragmentary sectional enlarged perspective views of a typical usage of the anti-chipping film according to the second embodiment.

FIGS. 3C-a and 3C-b are explanatory fragmentary sectional enlarged perspective views of a typical usage of the anti-chipping film according to the third embodiment.

FIG. 5A is a perspective back view showing a structure for mounting a cover as a resin member to be mounted onto the frame in FIG. 4, wherein the mounting structure is illustrated in an upside-down posture relative to an actual posture.

FIG. 5B is an enlarged view of the encircled region in FIG. 5A.

DETAILED DESCRIPTION OF THE PREFERRED EMBODIMENTS

Figure 1A:
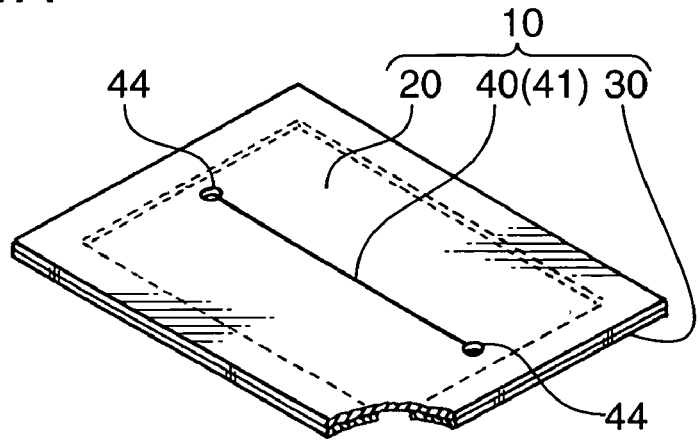
FIG. 1A is a perspective view showing an anti-chipping film having a linear-shaped slit, according to a first embodiment of the present invention.
Figure 1B:
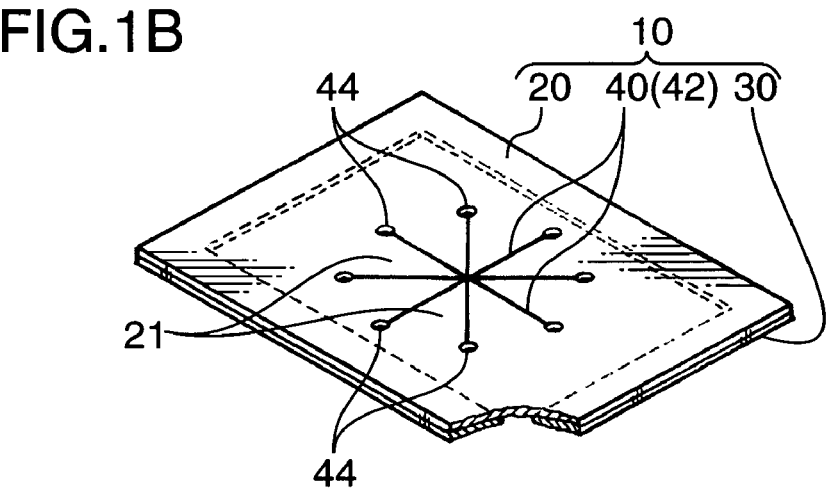
FIG. 1B is a perspective view showing an anti-chipping film having a radial-shaped slit, according to a second embodiment of the present invention.
Figure 1C:
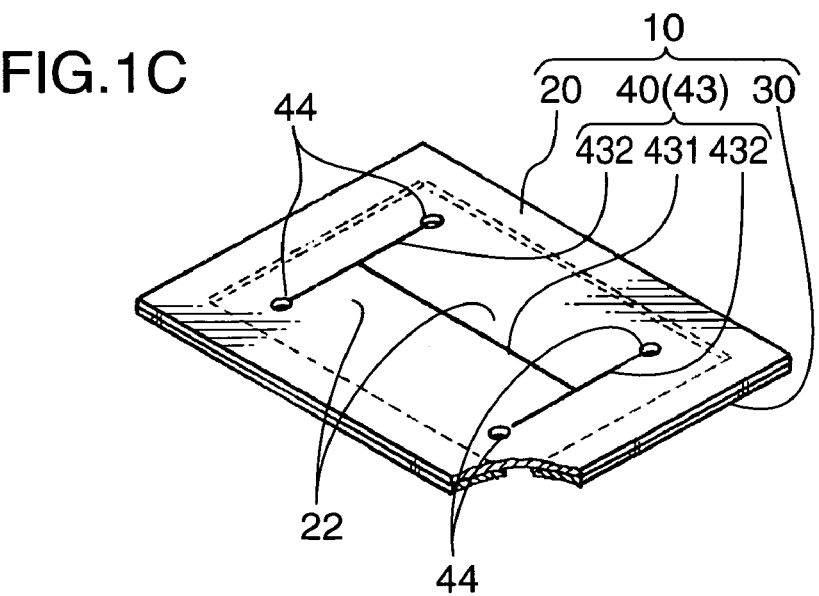
FIG. 1C is a perspective view showing an anti-chipping film having an H-shaped slit, according to a third embodiment of the present invention.

With reference to the drawings, various embodiments of the present invention will now be described. FIGS. 1A, 1B and 1C are perspective views showing, respectively, an anti-chipping film according to a first embodiment of the present invention, an anti-chipping film according to a second embodiment of the present invention, and an anti-chipping film according to a third embodiment of the present invention.

As shown in FIGS. 1A to 1C, each of the anti-chipping films 10 fundamentally comprises a film body 20, an adhesive layer 30 formed by applying a given adhesive on and around the entire outer peripheral region of the film body 20, and a slit 40 formed in a central region of the film body 20.

While the film body 20 in this embodiment is formed into a rectangular shape having a given size (30 mm×50 mm in this embodiment), the shape of the film body 20 is not limited to rectangle, but may be designed to have any other suitable shape, such as a circular shape, an oval shape or an irregular shape including a triangular shape, a polygonal shape and a star shape, depending on the shape, position, etc., of a target member. Further, the film body 20 is not limited to a specific dimensions or size, but may be designed to have an optimal size depending on the situation. Preferably, the film body 20 has a thickness of about 0.1 mm.

The film body 20 may be made of, but not limited to, a material including ionomer, ethylene-tetra fluoroethylene copolymer, polyamide, polyetherimide, polyether ether ketone, polyethylene, polyethylene oxide, polyethylene naphthalate, polyvinyl vinylidene, polyvinyl chloride, polycarbonate, polybutadiene, polypropylene and polymethylpentene. The film body 20 may also be made of any other suitable material having flexibility and a given tensile strength, for example, a cellulose-based material, such as paper.

The adhesive layer 30 is laminated on one (bottom surface in the embodiments illustrated in FIG. 1) of opposite surfaces of the film body 20 along the outer peripheral region at a given width through an application process etc. While the adhesive layer 30 in this embodiment is designed to have a width of about 5 mm, the width of the adhesive layer 30 is not limited to about 5 mm, but may be designed to have any other suitable value depending on the situation.

The adhesive layer may be made of, but limited to, a material including: a polymeric compound typified by acrylic ester; SRB (styrene-butadiene rubber); polyisobutylene; isobutylene-isoprene copolymer (butyl-rubber); chloroprene rubber; vinyl chloride-vinyl acetate copolymer; chlorinated rubber; and polyvinyl butyral. The adhesive layer may also be made of any other suitable adhesive.

The slit 40 is designed to allow an after-mentioned engagement protrusion 61 to penetrate therethrough. While three types of slits consisting of a linear-shaped slit 41 as shown in FIG. 1A (first embodiment), a radial-shaped slit 42 as shown in FIG. 1B (second embodiment) and an H-shaped slit 43 as shown in FIG. 1C (third embodiment) are described herein, the slits 40 in the present invention is not limited to the three types, but may have any other suitable shape, such as a zigzag shape, a wave shape or a cross shape.

The linear-shaped slit 41 (FIG. 1A), or the slit 40 in the first embodiment, is formed in a laterally (width-directionally) central position of the film body 20 to extend in a longitudinal direction of the film body 20 while keeping opposite ends thereof from overlapping with the adhesive layer 30. That is, the linear-shaped slit 41 is designed to be forcibly opened up or spread out in the lateral direction (width direction).

The film body 20 is formed with two anti-tearing holes 44, respectively, at the ends of the linear-shaped slit 41 so as to avoid stress concentration at the ends of the linear-shaped slit 44 when the linear-shaped slit 41 is forcibly opened up in the lateral direction. This prevents the film body 20 from being tone in an extending direction of the linear-shaped slit 41. The linear-shaped slit 41 is suitable compatible with or usable for an after-mentioned fork-shaped engagement protrusion 62.

The radial-shaped slit 42 (FIG. 1B) in the second embodiment comprises a plurality of radial slits which extend outward from the central position of the film body 20 in a radial pattern, and have distal ends located on a common circle. Thus, an isosceles triangle-like triangular film zone 21 is defined between the adjacent radial slits. Each of the radial slits has a length set to keep the distal end from overlapping with the adhesive layer 30.

In the same manner as that in the first embodiment, the film body 20 in the second embodiment is formed with a plurality of anti-tearing holes 44, respectively, at the distal ends of the radial slits to avoid a problem about occurrence of tearing from the distal ends of the radial slits even if the triangular film zones 21 are pulled by an external force acting thereon. The radial-shaped slit 42 is suitable compatible with or usable for an after-mentioned rod-shaped engagement protrusion 63.

The H-shaped slit 43 (FIG. 1C) in the third embodiment comprises a first linear slit 431 formed in the laterally central position of the film body 20 to extend in a longitudinal direction of the film body 20, and a pair of second linear slits 432 each branching from a corresponding one of opposite ends of the first linear slit 431 and extending in laterally opposite directions. Thus, a pair of rectangle-like quadrangular film zones 22 are defined in a region of the film body 20 surrounded by the first linear slit 431 and the pair of second linear slits 432. The film body 20 in the third embodiment is formed with four anti-tearing holes 44, respectively, at ends of the second linear slits 432 to prevent the film body 20 from being tore from the ends of the second linear slits 432 even if the quadrangular film zones 22 are pulled by an external force acting thereon.

With reference to FIGS. 2A to 3C-b, the usage of each of the above anti-chipping films 10 will be described below.

FIG. 2A and FIG. 2B are fragmentary enlarged perspective views showing, respectively, a metal sheet 50 to be attached with the anti-chipping film 10 having the linear-shaped slit 41 or the H-shaped slit 43 according to the first or third embodiment, and a metal sheet 50 to be attached with the anti-chipping film 10 having the radial-shaped slit 42 according to the second embodiment.

FIG. 3A, FIG. 3B and FIG. 3C are explanatory fragmentary sectional enlarged perspective views showing, respectively, a typical usage of the anti-chipping film 10 having the linear-shaped slit 41 according to the first embodiment, a typical usage of the anti-chipping film 10 having the radial-shaped slit 42 according to the second embodiment, and a typical usage of the anti-chipping film 10 having the H-shaped slit 43 according to the third embodiment, wherein FIG. 3A-*a*, 3B-a or 3C-a shows each of three resin members 60 formed with different types of engagement protrusions 61, and FIGS. 3A-*b*, 3B-b or 3C-b shows the state after each of the engagement protrusions 61 is connected with a corresponding of the metal sheets 50 through a corresponding one of the anti-chipping films 10.

The anti-chipping film 10 formed with the linear-shaped slit 41 (FIG. 1A) or the anti-chipping film 10 formed with the H-shaped slit 43 (FIG. 1C) is attached onto a metal sheet 50 formed with an elongated rectangular-shaped mounting hole 51 as shown in FIG. 2A. The anti-chipping film 10 formed with the radial-shaped slit 42 (FIG. 1B) is attached onto a metal sheet 50 formed with a circular-shaped mounting hole 52 as shown in FIG. 2B.

An operation for attaching the anti-chipping film 10 formed with the linear-shaped slit 41 according to the first embodiment onto the metal sheet 50, an operation for attaching the anti-chipping film 10 formed with the radial-shaped slit 42 onto the metal sheet 50, and an operation for attaching the anti-chipping film 10 formed with the H-shaped slit 43 onto the metal sheet 50 formed with the rectangular-shaped mounting hole 51, will be described in this order.

As shown in FIG. 2A, in the operation for attaching the anti-chipping film 10 formed with the linear-shaped slit 41 onto the metal sheet 50 formed with the rectangular-shaped mounting hole 51, the linear-shaped slit 10 is placed on the rectangular-shaped mounting hole 51 at a laterally central position to extend in a longitudinal direction of the rectangular-shaped mounting hole 51, and then the adhesive layer 30 is pressed onto a region of the metal sheet 50 around the rectangular-shaped mounting hole 51. In this way, the anti-chipping film 10 is adhesively attached onto the metal sheet 50.

In this state, the engagement protrusion 61 (fork-shaped engagement protrusion 62) protrudingly formed on the resin member 60 as shown in FIG. 3A-*a* is fitted into the rectangular-shaped mounting hole 51 through the linear-shaped slit 41. The fork-shaped engagement protrusion 62 comprises a pair of engagement plates 621 each having a longitudinal length slightly less than that of the rectangular-shaped mounting hole 51, and a pair of one-sided-arrowhead-shaped engagement pawls 622 formed, respectively, at distal ends of the engagement plates 621. The engagement pawls 622 are formed to protrude from the corresponding engagement plates 621 in opposite directions.

In each of engagement plates 621, a protruding length between a proximal end thereof on the side of a bottom surface (in FIG. 3A-*a*) of the resin member 60 and the engagement pawl 622 is designed to be slightly greater than a thickness of the metal sheet 50, and a distance between respective outer surfaces of the engagement plates 621 is designed to be slightly less than the width of the rectangular-shaped mounting hole 51.

During the course of fitting the fork-shaped engagement protrusion 62 into the rectangular-shaped mounting hole 51 of the metal sheet 50 through the linear-shaped slit 41 of the anti-chipping film 10, respective inclined outer surfaces of the engagement pawls 622 is guided by the edge of the rectangular-shaped mounting hole 51 to elastically deform the pair of engagement plates 621 in a direction coming closer to one another so as to allow the engagement plates 621 to gradually get into the rectangular-shaped mounting hole 51 together with a portion of the film body 20. Finally, the pair of engagement pawls 622 get out of the rectangular-shaped mounting hole 51, and the resin member 60 is connected with the metal sheet 50 through the fork-shaped engagement protrusion 62, as shown in FIG. 3A-*b*.

When the resin member 60 is connected with the metal sheet 50, each of the deformed engagement plates 621 returns to its original position based on a restoring force itself. Thus, each of the engagement pawls 622 is engaged with the edge of the rectangular-shaped mounting hole 51 so as to prevent the resin member 60 from being disengaged from the metal sheet 50.

In addition, during the course of connecting the resin member 60 having the fork-shaped engagement protrusion 62 to the metal sheet 50 attached with the anti-chipping film 10 having the linear-shaped slit 41, a portion of the film body 20 is interposed between the fork-shaped engagement protrusion 62 and the rectangular-shaped mounting hole 51 to avoid a direct contact between the fork-shaped engagement protrusion 62 and the edge of the rectangular-shaped mounting hole 51. This makes it possible to reliably prevent occurrence of a problem that a part of the fork-shaped engagement protrusion 62 made of resin is scraped away due to the contact between the fork-shaped engagement protrusion 62 and the edge of the rectangular-shaped mounting hole 51 so as to generate chips.

The following description will be made about the operation for attaching the anti-chipping film 10 formed with the radial-shaped slit 42 onto the metal sheet 50 formed with the circular-shaped mounting hole 52 illustrated in FIG. 2B. In this operation, an intersecting point of the radial slits is aligned with a center of the circular-shaped mounting hole 52, and then the adhesive layer 30 is pressed onto a surface of the metal sheet 50. In this way, the film body 20 is adhesively attached onto the metal sheet 50.

Then, the resin member 60 having the engagement protrusion 61 as shown in FIG. 3B-*a* (rod-shaped engagement protrusion 63) will be connected to the metal sheet 50 attached with the anti-chipping film formed with the radial-shaped slit 42. This rod-shaped engagement protrusion 63 comprises a columnar segment 631 protrudingly extending from one (bottom surface in FIG. 3B) of opposite surfaces of the resin member 60, and a conical segment 632 integrally formed with a distal end of the columnar segment 631 in a upside-down posture concentrically with the columnar segment 631.

In the columnar segment 631, an outer diameter is designed to be slightly less than an inner diameter of the circular-shaped mounting hole 52 of the metal sheet 50 (FIG. 2B), and a protruding length from the resin member 60 is designed to be slightly greater than a thickness of the circular-shaped mounting hole 52. In the conical segment 632, a diameter of the conical bottom is designed to be slightly greater than the inner diameter of the circular-shaped mounting hole 52.

The rod-shaped engagement protrusion 63 has a plurality of cut grooves 633 formed by cutting the columnar segment 631 from a tip (a lower end in FIG. 3B-*a*) of the conical segment 632 toward a proximal end of the columnar segment 631 along an axis thereof. Thus, respective portions of the conical segment 632 and the columnar segment 632 on the side of the tip are divided into two or more pieces by the cut grooves 633. That is, each of two or more divided portions 634 formed between the adjacent cut grooves 633 in the columnar segment 631, and each of two or more engagement pawl pieces 635 formed between the adjacent cut grooves 633 in the conical segment 632.

In the operation for mounting the resin member 60 having the rod-shaped engagement protrusion 63 onto the metal sheet 56 attached with the film body 20 having the circular-shaped mounting hole 52 formed therein and the radial-shaped slit 42 fixed thereon, the tip of the conical segment 631 is aligned with the intersecting point of the radial slits of the film body 20, and then the resin member 60 is pressed toward the metal sheet 50. During the course of this operation, the rod-shaped protrusion 63 is fitted onto the circular-shaped mounting hole 52 while bending the triangular film zones 21 of the film body 20 downward. Then, the conical segment 632 of the rod-shaped engagement protrusion 63 is pressingly fitted into the circular-shaped mounting hole 52 while being squeezed and narrowed in conjunction with elastic deformation in the divided portions 634 caused by contact between each of the engagement pawls 6 and an inner peripheral surface of the circular-shaped mounting hole 52.

Then, when the conical segment 632 passes through the circular-shaped mounting hole 52, it returns to its original position based on an elastic force of the divided portions. Thus, each of the engagement pawl pieces 635 is engaged with the edge of the circular-shaped mounting hole 52, so that the resin member 60 is connected with the metal sheet 50 in an anti-disengagement manner, as shown in FIG. 3B-*b*.

As above, during the course of connecting the resin member 60 having the rod-shaped engagement protrusion 63 to the metal sheet 50 attached with the anti-chipping film 10 having the radial-shaped slit 42, a portion of the triangular film zones 21 is interposed between the rod-shaped engagement protrusion 63 and the edge of the circular-shaped mounting hole 52 to prevent a direct contact between the rod-shaped engagement protrusion 63 and the edge of the circular-shaped mounting hole 52. This makes it possible to reliably prevent occurrence of a problem that a part of the rod-shaped engagement protrusion 63 made of resin is scraped away due to the above contact so as to generate chips.

The following description will be made about the operation for attaching the anti-chipping film 10 having the H-shaped slit 43 (FIG. 1C) according to the third embodiment onto the metal sheet 50 formed with the rectangular-shaped mounting hole 51 illustrated in FIG. 2A. In this operation, a resin member 60 to be mounted onto the metal sheet 50 has the engagement protrusion 61 as shown in FIG. 3C-*a* (hook-shaped engagement protrusion 64) is used.

As shown in FIG. 3C-*a*, the hook-shaped engagement protrusion 64 comprises a protrusion plate 641 protruding downward from one of opposite surfaces of the resin member 60, and an engagement plate 642 extending from a distal end of the protrusion plate 641 in a direction parallel to the resin member 60. In the protrusion plate 641, a protruding length from the resin member 60 is designed to be slightly greater than a thickness of the metal sheet 50, and a thickness is designed to be less than the width of the rectangular-shaped mounting hole 51. In the engagement plate 642, the sum of a protruding length from the protrusion plate 641 and a thickness of the protrusion plate 641 is designed to be less than the width of the rectangular-shaped mounting hole 51 to allow the hook-shaped engagement protrusion 64 to penetratingly inserted into the rectangular-shaped mounting hole 51.

This resin member 60 having the hook-shaped engagement protrusion 64 will be connected to the metal sheet 50 attached with the anti-chipping film 10 having the H-shaped slit 43 (FIG. 1C). This connecting operation is performed by pressing the hook-shaped engagement protrusion 64 toward the first linear slit 431 in the H-shaped slit 43. Through this pressing process, the quadrangular film zones 22 are laterally opened from the first linear slit 431 by the hook-shaped engagement protrusion 64. In this state, the hook-shaped engagement protrusion 64 is inserted into the rectangular-shaped mounting hole 51 through the pair of quadrangular film zones 22.

Then, after the hook-shaped engagement protrusion 64 is fully inserted into the rectangular-shaped mounting hole 51, the resin member 60 is moved in the protruding direction of the engagement plate 642. Thus, a space between the body of the resin member 60 and the engagement plate 642 of the hook-shaped engagement protrusion 64 is fitted on the edge of the rectangular-shaped mounting hole 51 as shown in FIG. 3C-*b* so as to allow the resin member 60 to be connected with the metal sheet 50.

During the course of connecting the resin member having the hook-shaped engagement protrusion 64 to the metal sheet 50 attached with the anti-chipping film 10 having the H-shaped slit 43, a portion of the quadrangular film zones 22 of the film body 20 is interposed between the hook-shaped engagement protrusion 64 and the edge of the rectangular-shaped mounting hole 51 to prevent a direct contact between the hook-shaped engagement protrusion 64 and the edge of the rectangular-shaped mounting hole 51. This makes it possible to reliably prevent occurrence of a problem that a part of the hook-shaped engagement protrusion 64 made of resin is scraped away due to the above contact so as to generate chips.

As described above in detail, the anti-chipping film 10 according each of the above embodiments of the present invention is adapted to be attachable to the given metal sheet 50 to cover the mounting hole (rectangular-shaped mounting hole 51 or the circular-shaped mounting hole 52) which is formed in the metal sheet 50 to mount the given resin member 60. The anti-chipping film 10 comprises the slit 40 (linear-shaped slit 41, radial-shaped slit 42 or H-shaped slit 43) formed in the central region thereof and adapted to allow the engagement protrusion 61 protrudingly formed on the resin member to penetrate therethrough, and the adhesive layer 30 laminated on the outer peripheral region thereof.

Thus, when used, the anti-chipping film 10 is placed on the metal sheet 50 in such a manner as to cover the mounting hole of the metal sheet 50, and then the adhesive layer 30 laminated on the peripheral region thereof is pressed onto the metal sheet 50. In this manner, the anti-chipping film 10 is adhesively attached onto the metal sheet 50. Then, during the process of inserting the engagement protrusion 61 of the resin member 60 from the side of the attached anti-chipping film 10 toward the mounting hole of the metal sheet 50 through the slit 40 formed in the central region of the anti-chipping film 10, the engagement protrusion 61 is gradually fitted into the mounting hole while bending the slit 40 toward the insertion direction. Thus, the bent portion of the anti-chipping film 10 is interposed between the engagement protrusion 61 and the edge of the mounting hole to allow the engagement protrusion 61 to avoid direct scraping against the edge of the mounting hole. This makes it possible to prevent generation of chips from the resin member 60.

Further, the anti-chipping film 10 according to the first embodiment which uses the linear-shaped slit 41 as the slit 40 is suitably compatible when the engagement protrusion 61 to be inserted into the linear-shaped slit 41 is a plate-shaped type, such as the fork-shaped engagement protrusion 62. The anti-chipping film 10 according to the second embodiment which uses the radial-shaped slit 42 as the slit 40 is suitably compatible when the engagement protrusion 61 to be inserted into the radial-shaped slit 42 is a boss-shaped type, such as the rod-shaped engagement protrusion 63. The anti-chipping film 10 according to the third embodiment which uses the H-shaped slit 43 as the slit 40 is suitably compatible when the engagement protrusion 61 to be inserted into the H-shaped slit 43 is an irregular-shaped type, for example, an engagement protrusion having an engagement pawl at a distal end thereof, such as the hook-shaped engagement protrusion 64.

Figure 4:
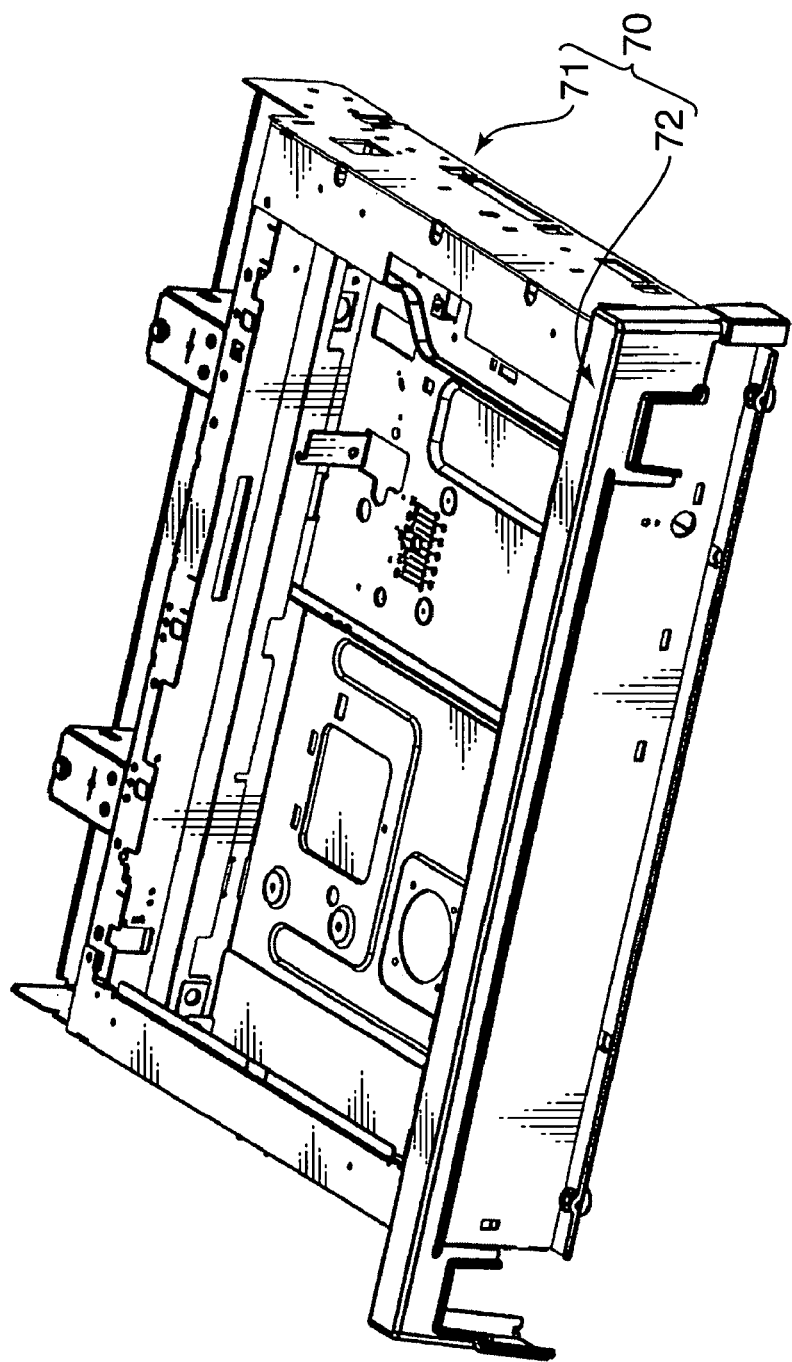
FIG. 4 is a perspective view showing a frame of an image reading unit to be built into a copy machine (image forming apparatus) as an electric apparatus according to one embodiment of the present invention.

With reference to FIG. 4 to FIG. 5B, an electric apparatus using the above anti-chipping films 10, according one embodiment of the present invention, will be described below. FIG. 4 is a perspective view showing a frame of an image reading unit to be built into a copy machine (image forming apparatus) as the electric apparatus. FIG. 5A is a perspective back view showing a structure for mounting a cover 72 as the resin member to be attached to the frame 70, and FIG. 5B is an enlarged view of the encircled region in FIG. 5A.

The image reading unit is disposed immediately below a contact glass located at an upper surface of a copier body and adapted to allow a document to be placed thereon. Within the box-shaped frame 70 having a bottom and an upper surface with an opening, the image reading unit is equipped with a scanning mechanism for scanning a surface of the document while irradiating the document surface with light from a light source, a precision optical device incorporated in the scanning mechanism, such as mirror and lens units, a precision electric device for receiving a reflected light obtained by the scanning operation of the scanning mechanism and converting the received light to an electric signal, such as CCD (Charge Coupled Device), etc.

The frame 70 of the image reading unit is fundamentally prepared by subjecting a metal sheet to a press working, and mounting various synthetic-resin members the pressed metal sheet at appropriate positions according to need. In the embodiment illustrated in FIG. 4, the frame 70 comprises a flat box-shaped frame body 71 made of a metal material, and a synthetic resin cover (resin member) 72 mounted onto a front surface of the frame body 71. The cover 72 is mounted onto a cover mounting frame (metal sheet) 73 through the anti-chipping film 10 of the present invention, and then the cover mounting frame 73 is mounted onto the frame body 71 to allow the cover 72 to be connected with the frame body 71.

The cover mounting frame 73 comprises a flat plate frame 731 having a flat plate shape, and a rim frame (metal sheet) 732 extending from one longitudinal edge of the plat plate frame 731 at an approximately right angle with the plat plate frame 731. As shown in FIG. 5A, the cover 72 is mounted onto the rim frame 732 through the anti-chipping film 10.

For the purpose of mounting the cover 72 onto the rim frame 732, the rim frame 732 is formed with a longitudinally elongated rectangle hole 733 as shown in FIG. 5B which serves as the aforementioned rectangular-shaped mounting hole 51, and an irregular circle hole 734 serving as the aforementioned circular-shaped mounting hole 52, on the right (in FIG. 5B) side of the rectangle hole 733. While the irregular circle hole 734 is different from the circular-shaped mounting hole 52 in that opposed upper and lower (in FIG. 5B) edges of the irregular circle hole 734 are formed into parallel linear lines, they are functionally approximately the same. The anti-chipping film 10 having the H-shaped slit 43 (FIG. 1C) is attached on a front (on the back side of the drawing sheet of FIGS. 5A and 5B) surface of the rim frame 732 at a position corresponding to the rectangle hole 733, and the anti-chipping film 10 having the radial-shaped slit 42 (FIG. 1B) is attached on the front surface of the rim frame 732 at a position corresponding to the irregular circle hole 734.

The cover 72 is formed with an engagement member 721 serving as the hook-shaped engagement protrusion 64 (FIG. 3C), and a boss 725 serving as the rod-shaped engagement protrusion 63 (FIG. 3B), respectively, at positions corresponding to the rectangle hole 733 and the irregular circle hole 734. The engagement member 721 comprises a protrusion plate 723 protrudingly extending from the cover 72 at an approximately right angle with the cover 72, and an engagement piece 724 extending upward (in FIG. 5B) from a tip of the protrusion plate 723 at an approximately right angle with the protrusion plate 723. The boss 725 has no portion corresponding to the engagement pawl pieces 635 formed in the rod-shaped engagement protrusion to serve as anti-disengagement means.

In an operation for mounting the cover 72 onto the rim frame 732, the boss 725 is inserted into and positioned by the irregular circle hole 734, and then the engagement member 721 is inserted into the rectangle hole 733. In this state, the cover 72 is rotated clockwise (in FIG. 5B) about the boss 725 to allow the engagement pawl piece 724 of the engagement member 721 to be engaged with an upper (in FIG. 5) edge of the rectangle hole 733 (FIGS. 5A and 5B illustrates the cover mounting frame 73 in an upside-down posture, and therefore the engagement pawl piece 724 is actually engaged with an lower edge of the rectangle hole 733). Through the above operation, the cover 72 is mounted onto the cover mounting frame 73 in an anti-disengagement manner.

In the course of inserting the boss 725 into the irregular circle hole 734, the boss 725 is fitted into the irregular circle hole 734 while pressingly bending a portion of the triangular film zones 21 in a forward (relative to the drawing sheet of FIG. 5B) direction, so as to prevent the boss 725 from coming into direct contact with a peripheral edge of the irregular circle hole 734. This makes it possible to reliably prevent occurrence of a problem that a part of the boss 725 made of resin is scraped away due to the above contact with the peripheral edge of the irregular circle hole 734 so as to generate chips.

As described above in detail, in the electric apparatus according to this embodiment, the synthetic resin cover 72 is mounted onto the metal cover mounting frame 72 containing the optical devices, and then the cover 72 is mounted onto the cover mounting frame 72 through the anti-chipping film 10. In an assembling process of the electric apparatus, during the operation for mounted the cover 72 onto the metal sheet, the cover 72 can be free from the risk of generation of chips. This makes it possible to prevent occurrence of a problem that chips get into and scatter over an inner space of the frame and attach onto the various precision devices to cause malfunction in the precision devices.

Particular, in the electric apparatus is the image reading unit of the copying machine incorporating the optical devices, the cover 72 can be free from the risk of generation of chips during an assembling process of the image reading unit. This makes it possible to prevent occurrence of a problem, for example, that chips accumulate on a guide rail for movably guiding a scanner of the image reading unit to hinder a normal movement of the scanner, or chips attach on a surface of the lens and/or mirror to preclude the image reading unit from normally reading an image.

It is understood that the present invention is not limited to the above embodiments. For example, the following modifications may be made therein.

While the slit 40 formed in the anti-chipping film 10 in the above embodiments includes the linear-shaped slit 41 illustrated in FIG. 1A, the radial-shaped slit 42 illustrated in FIG. 1B, and the H-shaped slit 43 illustrated in FIG. 1C, the slit 40 in the present invention is not limited to the linear-shaped slit 41, the radial-shaped slit 42 and the H-shaped slit 43, but any other suitable shape, such as a zigzag shape or a wave shape, may be used therein depending on the situation.

While the slit 40 in the above embodiments is formed in the central region of the film body 20, the position of the slit 40 in the present invention is not limited to the central region of the film body 20, but any other suitable position may be appropriately selected depending on the situation.

While the "hole formed in the metal sheet 50 to mount the resin member 60" in the above embodiments includes the rectangular-shaped mounting hole 51 illustrated in FIG. 2A and the circular-shaped mounting hole 52 illustrated in FIG. 2B, the "hole formed in the metal sheet 50 to mount the resin member 60" in the present invention is not limited to the rectangular-shaped mounting hole 51 and the circular-shaped mounting hole 52, but it may be formed into any other suitable shape, such as an oval-shape hole or a star-shaped hole, depending on the situation.

While the film body 20 in the above embodiments is formed with the anti-tearing hole 44 for preventing tearing therein, at the end of the slit 40, the anti-tearing hole 44 is not essential to the present invention, but may be omitted.

While the "electric apparatus using the anti-chipping film 10" in the above embodiment is the image forming apparatus, the "electric apparatus using the anti-chipping film 10" of the present invention is not limited to the image forming apparatus, but the present invention may be applied to any other suitable structure where various types of synthetic resin members are mounted onto a metal frame, for example household electric apparatuses or office machines.

While the anti-chipping film 10 in the above embodiments is fundamentally composed of the film body 20 and the adhesive layer 30 laminated on the outer peripheral region of the film body 20, the film body 20 may be prepared without forming a specific adhesive layer 30 thereon, and subsequently attached to a target metal sheet using a separately-prepared adhesive and an engagement pin.

As described above, an inventive anti-chipping film is adapted to be attachable to a given metal sheet to cover a mounting hole which is formed in the metal sheet to mount a given resin member. The anti-chipping film is formed with a slit to allow an engagement protrusion protrudingly formed on the resin member to penetrate therethrough, and an adhesive layer laminated on an outer peripheral region thereof.

When used, the above anti-chipping film is placed on the metal sheet in such a manner as to cover the mounting hole of the metal sheet, and then the adhesive layer laminated on the peripheral region thereof is pressed onto the metal sheet. In this manner, the anti-chipping film is attached onto the metal sheet. Then, during the course of inserting the engagement protrusion of the resin member from the side of the attached anti-chipping film toward the mounting hole through the slit formed in the anti-chipping film, the engagement protrusion is gradually fitted into the mounting hole while bending a portion of the anti-chipping film around the slit toward the insertion direction. Thus, the bent portion of the anti-chipping film is interposed between the engagement protrusion and an edge of the mounting hole to allow the engagement protrusion to avoid direct scraping against the edge of the mounting hole. This makes it possible to prevent generation of chips from the resin member.

In the anti-chipping film, the slit may have at least one selected from the group consisting of a linear shape, a radial shape and an H shape.

The linear-shaped slit is suitably compatible with a plate-shaped engagement protrusion to be inserted therethrough, and the radial-shaped slit is suitably compatible with a boss-shaped engagement protrusion to be inserted therethrough. Further, the H-shaped slit is suitably compatible with an irregular-shaped engagement protrusion to be inserted therethrough, for example, an engagement protrusion having an engagement pawl at a distal end thereof.

Also, an inventive electric apparatus comprises: a frame which includes a metal sheet formed with a given mounting hole, and a resin member having an engagement protrusion inserted into the mounting hole; and an anti-chipping film formed with a slit and attached to the mounted hole. The engagement protrusion is inserted into the mounting hole through the slit.

In an assembling process of the electric apparatuses, during an operation for mounting the resin member onto the metal sheet, the resin member is free from the risk of generation of chips. This makes it possible to prevent occurrence of a problem that chips get into and scatter over an inner space of the frame and attach onto various precision devices to cause malfunction in the precision devices.

In the electric apparatus, the frame may constitute an image reading unit for an image forming apparatus.

In an assembling process of the above image reading unit, the resin member is free from the risk of generation of chips. This makes it possible to prevent occurrence of a problem that chips accumulate on a guide rail for movably guiding a scanner of the image reading unit to hinder a normal movement of the scanner, or chips attach on a surface of an optical component, such as lens or mirror, to preclude the image reading unit from normally reading an image.

Accordingly, the inventive anti-chipping film and electric apparatus have the following advantageous effects.

After the anti-chipping film is placed on the metal sheet in such a manner as to cover the mounting hole of the metal sheet, and fixed to the metal sheet by pressing onto the metal sheet the adhesive layer laminated on the peripheral region thereof, the engagement protrusion of the resin member is inserted from the side of the attached anti-chipping film toward the mounting hole through the slit formed in the anti-chipping film. During this process, the engagement protrusion is gradually fitted into the mounting hole while bending a portion of the anti-chipping film around the slit toward the insertion direction. Thus, the bent portion of the anti-chipping film is interposed between the engagement protrusion and the edge of the mounting hole. This makes it possible to reliably prevent generation of chips from the resin member.

The slit formed in the anti-chipping film may have a linear shape allowing for being suitably compatible with a plate-shaped engagement protrusion to be inserted therethrough, or a radial shape allowing for being suitably compatible with a boss-shaped engagement protrusion to be inserted therethrough, or an H shape allowing for being suitably compatible with an irregular-shaped engagement protrusion to be inserted therethrough, for example, an engagement protrusion having an engagement pawl at a distal end thereof.

Further, during the operation for mounting the resin member onto the metal sheet to form the frame in an assembling process of the electric apparatus, the resin member is free from the risk of generation of chips. This makes it possible to reliably prevent occurrence of a problem that chips get into and scatter over an inner space of the frame and attach onto various precision devices to cause malfunction in the precision devices.

The frame may constitute an image reading unit for an image forming apparatus. In this case, the resin member is free from the risk of generation of chips in an assembling process of the image reading unit. This makes it possible to reliably prevent occurrence of a problem that generated chips preclude normal image reading.

This application is based on patent application No. 2004-333071 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An electric apparatus comprising:
a frame including a metal sheet formed with a mounting surface and mounting hole extending into the mounting surface;
an anti-chipping film being flexible and having opposite first and second surfaces and a plurality of outer peripheral edges defining an outer periphery of the anti-chipping film, an adhesive disposed on the first surface of the anti-chipping film and extending along all of the outer peripheral edges, the adhesive being attached to the mounting surface of the metal sheet at locations outwardly from the mounting hole, at least one slit extending through the anti-chipping film at locations inwardly from the adhesive, portions of the anti-chipping film inwardly of the adhesive and adjacent the at least one sit being deformed into the mounting hole, anti-tearing holes being provided at ends of the slit for substantially preventing tearing; and
a resin member having an engagement protrusion projecting from the surface, the engagement protrusion being inserted into the mounting hole through the slit so that the surface of the resin member engages portions of the second surface of the anti-chipping film outwardly of the mounting hole and so that portions of the anti-chipping film adjacent the slit are disposed in the mounting hole between the engagement protrusion and the metal sheet.

2. The electric apparatus as defined in claim 1, wherein the frame constitutes an image reading unit for an image forming apparatus.

3. The electric apparatus as defined in claim 1, wherein the at least one slit consists of a single slit that has a linear shape.

4. The electrical apparatus as defined in claim 1, wherein the at least one slit comprises a plurality of slits arranged to define an H shape.

5. The electrical apparatus as defined in claim 1, wherein the at least one slit comprises a plurality of slits arranged in a radial pattern so that adjacent slits intersect substantially at a point.

* * * * *